United States Patent [19]
Viola

[11] Patent Number: 4,592,951
[45] Date of Patent: Jun. 3, 1986

[54] INK JET RECORDING SHEET

[75] Inventor: Michael S. Viola, Burlington, Mass.

[73] Assignee: Polaroid Corporation, Cambridge, Mass.

[21] Appl. No.: 631,863

[22] Filed: Jul. 18, 1984

[51] Int. Cl.$^4$ .................. B32B 5/16; B32B 27/36; B05D 1/36; B05D 5/06
[52] U.S. Cl. .................. 428/323; 346/135.1; 427/261; 428/207; 428/325; 428/331; 428/404; 428/480
[58] Field of Search .............. 428/207, 323, 211, 404, 428/342, 331, 325, 413, 480; 346/135.1; 427/385.5, 261

[56] References Cited

U.S. PATENT DOCUMENTS

| | | | |
|---|---|---|---|
| 4,269,891 | 5/1981 | Minagawa | 346/135.1 X |
| 4,460,637 | 7/1984 | Miyamoto et al. | 428/207 X |
| 4,478,910 | 10/1984 | Oshima et al. | 428/342 X |

FOREIGN PATENT DOCUMENTS

| | | | |
|---|---|---|---|
| 0051583 | 4/1980 | Japan | 428/211 |
| 0107878 | 7/1982 | Japan | 428/404 |

*Primary Examiner*—Thomas J. Herbert

[57] ABSTRACT

An ink jet recording sheet comprising a transparent support carrying a layer of cross-linked polyvinyl alcohol.

24 Claims, No Drawings

INK JET RECORDING SHEET

BACKGROUND OF THE INVENTION

Ink jet printing refers to a method of forming type characters on a paper by ejecting ink droplets from a printhead from one or more nozzles. Several schemes are utilized to control the deposition of the ink droplets on the printing substrate or recording sheet to form the desired characters. For example, one method comprises deflecting electrically-charged droplets by electrostatic means. Another method comprises the ejection of single droplets under the control of a piezoelectric device. One type of ink employed is the so-called non-drying type which functions by quickly penetrating the substrate, e.g., paper fibers, thus giving the appearance of being dry to the touch even though still possessing a quantity of relatively low vapor pressure solvent. Another widely used type of ink are aqueous inks, that is, inks which are composed of a relatively large quantity of water which functions as the solvent and carrier for the dyes therein. Aqueous inks, however, suffer from the deficiency of lack of stability to moisture, i.e., poor water-resistance on the printed substrate which causes loss of resolution in the image. This can occur even when the printed records are stored in areas of relatively high humidity.

The image generated by an ink jet printing device may be either in the form of a reflection print wherein the image is deposited on a substantially opaque reflective substrate, for example, when the image is formed on a sheet such a paper or may comprise a transparency, that is, when the image is formed on a substantially transparent recording substrate and is viewed by illuminating the side of the substrate opposite the image side and viewing from the image side. Such material is, of course, particularly advantageous for use in viewing by projection.

Since projection of a transparency generally involves enlarging of the image, it will be seen that the image quality requirements are more stringent for a transparency than for an image viewed by reflection. Of course a transparency must take into consideration the other problems which may be common to both the transparency and to the reflection image, for example, the water fastness problem discussed above when aqueous inks are employed.

U.S. Pat. No. 4,269,981 issued May 26, 1981 is directed to a recording sheet for ink jet recording which can be viewed under both reflected and transmitted light and which comprises a support and an ink-absorbing layer provided on said support wherein said ink absorbing layer comprises a white pigment having ink-absorbing abilities and a binder resin possessing film-forming ability. As examples of suitable white pigments, mention is made of clay, talc, diatomacious earth, calcium carbonate, titanium dioxide and the like. As examples of suitable binder materials, mention is made of oxidized starch, etherified starch, gelatin, casein, hydroxyethyl cellulose, polyvinyl alcohol and the like.

See also Japanese Pat. No. 5614583 and German Pat. No. 3,024,205 for other disclosures of polyvinyl alcohol as a binder for pigments, such as calcium carbonate or micropowders such as silicic acid.

Generally, when used alone, a layer of polyvinyl alcohol is not suitable as a receptor layer for ink jet recording systems employing aqueous based inks. Such layers are often too tacky after receiving the ink.

SUMMARY OF THE INVENTION

The present invention is directed to a printing substrate adapted to produce transparencies, which comprises a recording sheet comprising a transparent support carrying on one surface a layer of cross-linked polyvinyl alcohol.

DETAILED DESCRIPTION OF THE INVENTION

The present invention is directed to a printing substrate for use with inks which are predominantly water-based. The terms "water-based inks" and "aqueous inks" as used herein are intended to refer to ink compositions wherein the solvent or carrier liquid is at least about 50% water by weight. In addition to water and dyes or pigments, such inks also typically contain humectants, organic solvents, detergents, thickeners, preservatives and the like.

It has now been found that by employing cross-linked polyvinyl alcohol as the receptor layer for use in an ink jet printing process significantly improved performance in terms of improved density, water and light fastness, film toughness and dot spreading. Blocking, in the case of stacked sheets, is also minimized with the novel receptor sheet of the present invention.

Cross-linking of the polyvinyl alcohol may be carried out by treating the polyvinyl alcohol with any conventional cross-linking agent for polyvinyl alcohol provided that the optical properties of sheet would not be adversely affected so as to render the cross-linked sheet unsuitable for use as a trnasparency. A particularly preferred method of cross-linking comprises borating the polyvinyl alcohol. The polyvinyl alcohol may be borated by reacting the polyvinyl alcohol with a boron compound. As examples of suitable boron compounds, mention may be made of boric acid, methyl borate, boron trifluoride, boric anhydride, pyroborates, peroxoborates and boranes. Particularly preferred is sodium tetraborate decahydrate (borax). The boron compound may be added to the polyvinyl alcohol coating formulation or it may be applied as an aqueous solution overcoat to the already formed layer of polyvinyl alcohol.

In an alternative embodiment, chromium chloride may be employed as a cross-linking agent, either added to the polyvinyl alcohol coating solution or to the layer of polyvinyl alcohol on the transparent support.

In an alternative embodiment, the polyvinyl alcohol layer may include up to about 0.2% by weight, based on the weight of the polyvinyl alcohol of particulate material less than about 30 micrometers in size. Such materials provide antiblocking characteristics to the recording sheet particularly after it has been printed on without adversely effecting the transparent characteristics of the sheet. As examples of suitable particulate materials, mention may be made of silica, glass beads and polytetrafluoroethylene particles.

In a preferred embodiment, it has now been found that incorporating an ethoxylated surfactant in the borated polyvinyl alcohol layer of the present invention further enhances control of dot size in the printing operation.

The support employed in the present invention is not critical. Polymeric films of both synthetic and those derived from naturally occurring materials may be employed. As examples of suitable transparent polymeric materials, mention may be made of polymethacrylic acid; methyl and ethyl esters; polyamides, such as nylons; polyesters, such as the polymeric films derived from ethylene glycol terephthalate acid; polymeric cellulose derivitives; polycarbonates; polystyrene and the like. To promote adhesion, subcoats or surface treatments such as corona discharge may be employed.

What is claimed is:

1. A transparent ink jet recording sheet comprising a transparent support carrying a layer of cross-linked polyvinyl alcohol.

2. The product of claim 1 wherein said cross-linked polyvinyl alcohol is borated polyvinyl alcohol.

3. The product of claim 1 wherein said polyvinyl alcohol is cross-linked with chromium chloride.

4. The product of claim 1 wherein said support is polyethylene terephthalate.

5. The product of claim 1 wherein said layer includes up to 0.2% by weight particulate material less than 30 micrometers in size.

6. The product of claim 5 wherein said particulate material is silica.

7. The product of claim 5 wherein said particulate material is glass beads.

8. The product of claim 1 wherein said layer includes an ethoxylated surfactant.

9. The product of claim 8 wherein said surfactant is nonylphenoxypoly (ethylenloxy) ethanol.

10. The method of ink jet printing which comprises contacting a transparent recording sheet with at least one stream of ink droplets generated from an ink jet printer, wherein said recording sheet comprises a transparent support carrying a layer of cross-linked polyvinyl alcohol.

11. The method of claim 10 wherein said cross-linked polyvinyl alcohol is borated polyvinyl alcohol.

12. The method of claim 10 wherein said polyvinyl alcohol is cross-linked with chromium chloride.

13. The method of claim 10 wherein said layer includes up to 0.2% by weight particulate material less than 30 micrometers in size.

14. The method of claim 10 wherein said support is polyethylene terephthalate.

15. The method of claim 10 wherein said layer includes an ethoxylated surfactant.

16. The method of claim 15 wherein said surfactant is nonylphenoxypoly (ethylencoxy) ethanol.

17. The method of forming a transparent recording sheet adapted to receive an image formed from ink droplets generated by an ink jet printer which comprises coating a transparent support with a layer of polyvinyl alcohol and cross-linking said polyvinyl alcohol.

18. The method of claim 17 wherein said polyvinyl alcohol is cross-linked prior to coating on said support.

19. The method of claim 17 wherein said polyvinyl alcohol is cross-linked subsequent to forming said layer.

20. The method of claim 17 wherein said layer of polyvinyl alcohol includes an ethoxylated surfactant.

21. The method of claim 17 wherein said layer includes up to 0.2% by weight particulate material.

22. The method of claim 17 wherein said polyvinyl alcohol is borated.

23. The method of claim 22 wherein a boron compound is added to said polyvinyl alcohol prior to forming said layer.

24. The method of claim 22 wherein a solution of a boron compound is added to said layer of polyvinyl alcohol.

* * * * *